(12) United States Patent
Victor (10) Patent No.: US 11,118,614 B2
(45) Date of Patent: Sep. 14, 2021

(54) PROCESS FOR PRE-ASSEMBLING A CONNECTING ELEMENT TO A FIRST COMPONENT PART, AND PROCESS FOR FRICTIONALLY-COUPLING A FIRST AND A SECOND COMPONENT PART WITH A CONNECTING ELEMENT

(71) Applicant: 3M INNOVATIVE PROPERTIES COMPANY, St. Paul, MN (US)

(72) Inventor: Georg P. Victor, Wiggensbach (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 17/125,588

(22) Filed: Dec. 17, 2020

(65) Prior Publication Data

US 2021/0190106 A1 Jun. 24, 2021

(30) Foreign Application Priority Data

Dec. 18, 2019 (EP) ..................................... 19217378

(51) Int. Cl.
*F16B 5/02* (2006.01)

(52) U.S. Cl.
CPC ...................................... *F16B 5/02* (2013.01)

(58) Field of Classification Search
CPC ................. F16B 5/02; Y10T 29/49826; Y10T 29/49904; Y10T 29/49947; Y10T 29/49954
See application file for complete search history.

(56) References Cited

U.S. PATENT DOCUMENTS

| 1,413,998 | A | * | 4/1922 | Templeton | ........... F16B 19/1081 411/15 |
| 3,270,410 | A | * | 9/1966 | Salter | ....................... F16B 31/06 29/446 |
| 3,298,725 | A | * | 1/1967 | Boteler | ................... F16B 19/02 403/282 |
| 3,391,449 | A | * | 7/1968 | Briles | ...................... B21J 15/02 29/524.1 |
| 5,033,909 | A | | 7/1991 | McCartney | |

(Continued)

FOREIGN PATENT DOCUMENTS

| DE | 10-2013-108035 | 2/2014 |
| EP | 3339658 | 8/2019 |

(Continued)

OTHER PUBLICATIONS

English transition WO2015082365 (Year: 2015).*
Extended EP Search Report for EP Application No. 19217378.9, dated Jun. 9, 2020, 2 pages.

*Primary Examiner* — Jason L Vaughan
*Assistant Examiner* — Amanda Kreiling
(74) *Attorney, Agent, or Firm* — Thomas M. Spielbauer (57) ABSTRACT

The present disclosure relates to a process for pre-assembling a connecting element to a first component part, and to a process for frictionally-coupling a first and a second component part.
The present disclosure further relates to a frictional connection comprising a first component part and a second component part and a connecting element, and to the use of said frictional connection to connect a first component part and a second component part to be joined in machine, plant and motor vehicle construction and energy generation.

12 Claims, 7 Drawing Sheets

(56) References Cited

U.S. PATENT DOCUMENTS

| | | | |
|---|---|---|---|
| 6,347,905 | B1 | 2/2002 | Lukschandel |
| 6,523,834 | B2 * | 2/2003 | Philipson .............. C09K 3/1021 |
| | | | 277/523 |
| 2003/0077115 | A1 | 4/2003 | Bryde |
| 2011/0039119 | A1 | 2/2011 | Berger |
| 2017/0335869 | A1 | 11/2017 | Bui |

FOREIGN PATENT DOCUMENTS

| | | |
|---|---|---|
| FR | 3015596 | 6/2015 |
| WO | WO-2015082365 A1 * | 6/2015 .............. F16B 2/005 |

* cited by examiner

PROCESS FOR PRE-ASSEMBLING A CONNECTING ELEMENT TO A FIRST COMPONENT PART, AND PROCESS FOR FRICTIONALLY-COUPLING A FIRST AND A SECOND COMPONENT PART WITH A CONNECTING ELEMENT

TECHNICAL FIELD

The present disclosure relates to a process for pre-assembling a connecting element to a first component part, the connecting element being used for the friction-increasing connection of a first and second component to be joined.

BACKGROUND

Force-locked connections are frequently used in all areas of machine, plant and motor vehicle construction and energy generation for the transmission of forces or torques. The amount of force that can be transmitted depends not only on the structural design but also primarily on the static friction value (coefficient of static friction) of the component surfaces connected to one another. Therefore, in the case of such force-locked connections, it is endeavored to provide friction-increasing measures that allow the greatest possible transverse forces and torques to be transmitted safely. Further, force-locked connections may also be referred to as non-positive connections or frictional connections.

It is known to use friction-increasing interlayers to increase the holding forces or increase the torques than can be transmitted in bolted and clamped connections. U.S. Pat. No. 6,347,905 B1 discloses a connecting element for the friction-increasing play-free reversible connection of components to be joined. The connecting element comprises a spring-elastic steel foil which bears on its surface particles of a defined size, which are fixed on the spring-elastic foil by means of a metallic binder phase. The particles consist of a hard material, preferably of diamond, cubic boron nitride, aluminum oxide, silicon carbide or boron carbide. The hard particles are coated with metallic binder phase on the spring-elastic foil by a galvanic coating process. By using this separate connecting element, the coefficient of static friction can be increased in frictional connections.

During assembly of the connecting elements described in U.S. Pat. No. 6,347,905 B1, however, several problems can arise. A common embodiment of the friction-increasing connecting element from U.S. Pat. No. 6,347,905 B1 is in the form of punched, planar rings or disks which are manually inserted during assembly of the respective non-positive connection. This operation entails the risk of such an insert—which is usually only about 0.1 mm thin—getting lost unnoticed before the connection is finally put together.

The connecting element corresponding to U.S. Pat. No. 6,347,905 B1 is also scarcely distinguishable with the naked eye from blank metal components, since about 90% of the surface consists of chemical nickel. It is therefore sometimes difficult for the assembly personnel to detect the actual presence of the connecting element that is essential for the operational safety of the connection as a whole. This may have considerable associated safety risks. In the case of motor vehicle engines, for example, gear wheels in the crankshaft-camshaft drive system are assembled with such connecting elements. The failure of the screwed connection that is conventionally used here can lead to spontaneous total engine failures.

To be able to satisfy the requirements with respect to preventing loss of the connecting element, US 2003/077115 A1 proposes a connecting element which has a component surface which lies outside the joining surfaces of the connecting element and is formed in such a way that it has a resilient or elastic property which permits reversible fixing of the connecting element on a workpiece to be joined. The component surface preferably takes the form of lugs or clamping lobes protruding from the joining surface. With these connecting elements, manual pre-assembly is possible.

However, the solution proposed in US 2003/077115 A1 has the disadvantage that the handling of the connecting elements with the protruding lugs/clamping lobes is difficult, giving rise to a risk of damage during the unavoidable handling steps in the production process as a whole and the subsequent logistical and assembly-related processes. Moreover, the increased space requirement during the coating process and also during packaging and transportation causes higher costs for the connecting element. On the workpiece to be joined, notches are required for the lugs/clamping lobes which causes higher costs for the workpiece to be joined.

US 2011/0039119 A1 discloses a further method for pre-assembling a connecting element. By this method, the connecting element is fixed on the metal workpiece securely for purposes of assembly and transportation by welding involving the formation of locally confined weld points. The welding process is very expensive, as a separate welding equipment is required for the pre-assembling of the connecting element.

EP 3 339 658 A1 proposes an adhesive coating for pre-assembling of the connecting element. Disadvantages of this solution are the additional costs caused by the separate production step of applying the adhesive to the connecting element and that the condition of the surface of the component to be joined may significantly influence the adhesion.

Therefore, there is a need to further improve frictional connections of components with respect to mechanical pre-assembly of connecting elements for friction-increasing connection of components to be joined.

SUMMARY

In a first aspect, the present disclosure relates to a process for pre-assembling a connecting element to a first component part, comprising providing a connecting element and a first component part, wherein the connecting element comprises a substrate having a first joining surface on one side of the substrate and a second joining surface on an opposite side of the substrate, wherein each joining surface comprises hard particles fixed on the substrate by a binder layer, and wherein the first component part has a joining surface, and wherein the connecting element has a hole, and wherein the first component part has a hole, providing a fixing element for pre-assembling the connecting element to the first component part, wherein the fixing element comprises a first portion and a second portion, and wherein the fixing element has a shape that allows the first portion of the fixing element to be inserted into the hole of the connecting element and the hole of the first component part, and wherein the first portion of the fixing element has a circumscribed circle with a diameter being larger than the diameter of the hole of the first component part, and wherein the second portion of the fixing element has a circumscribed circle with a diameter being larger than the diameter of the hole of the connecting element, and wherein the first portion of the fixing element has elastically compressible properties, and wherein the second portion of the fixing element has compressible properties, bringing the first joining surface of the connecting element into close contact with the joining surface of the first component part and aligning the hole of the connecting element with the hole of the first component part, and inserting the first portion of the fixing element into the hole of the connecting element and the hole of the first component part, wherein the second portion of the fixing element is not inserted into the hole of the connecting element and the hole of the first component part, and wherein the inserted first portion of the fixing element exerts a force against the inner lateral surface of the hole of the first component part, thereby pre-assembling the connecting element to the first component part by the fixing element.

Further disclosed herein is also a process for frictionally-coupling a first component part and a second component part with a connecting element, the process comprising pre-assembling the connecting element to the first component part by the process disclosed herein, providing a second component part having a component joining surface and a hole, providing a bolt with dimensions such that it can be inserted into the hole of the first component part and the hole of the second component part and into the hole of the connecting element, aligning the hole of the second component part with the hole of the connecting element and the hole of the first component part, inserting the bolt into the hole of the second component part, inserting the bolt into the hole of the connecting element and the hole of the first component part and removing the fixing element from the hole of the connecting element and moving the fixing element completely into the hole or out of the hole of the first component part, bringing the second joining surface of the connecting element into close contact with the joining surface of the second component part, pressing the hard particles of the first joining surface of the connecting element into the component joining surface of the first component part, pressing the hard particles of the second joining surface of the connecting element into the component joining surface of the second component part, and mechanically fixing the bolt, thereby frictionally-coupling the first component part and the second component part with the connecting element.

In yet a further aspect, the present disclosure relates to a frictional connection comprising a first component part having a component joining surface, a second component part having a component joining surface, and a connecting element, wherein the first and second component part are frictionally joined with the connecting element by the process as disclosed herein.

In yet a further aspect, the present disclosure also relates to the use of a frictional connection as disclosed herein to connect a first component part and a second component part to be joined in machine, plant and motor vehicle construction and energy generation.

By the process for pre-assembling a connecting element to a first component part as disclosed herein, the connecting element can be securely fixed to the first component part, and there is no risk for the connecting element getting lost unnoticed before the connection is finally put together. A connecting element being pre-assembled to a first component part, i.e. to one of the two component parts to be frictionally joined, can be transported, for example to the manufacturer finally assembling the frictional connection of the two component parts to be joined.

Furthermore, by the process for pre-assembling a connecting element to a first component part as disclosed herein, it is possible to detect the actual presence of the connecting element before the connection is finally put together. As long as the fixing element is inserted into the hole of the connecting element and the hole of the first component part, the assembly personnel can be sure that a connecting element is present. The fixing element can be detected by the assembly personnel, and it can also be detected by automated identification systems.

By using a connecting element according to the present disclosure, the coefficient of static friction of frictional connections is increased. The coefficient of static friction of the frictional connection with the connecting element is not adversely affected and remains unchanged by pre-assembling of the connecting element to a first component part by the process as disclosed herein.

The process for pre-assembling a connecting element to a first component part as disclosed herein has the further advantage that no grooves or undercuts for pre-assembly are required. Also, it is not required to modify the connecting element, for example with lugs or clamping lobes protruding from the joining surface. The process for pre-assembling is working independently from surface conditions of the joining surface of the first component part, i.e. the process for pre-assembling can also be used when the surface of the first component part is not dry or not free of oil or dust.

BRIEF DESCRIPTION OF THE DRAWINGS

The present disclosure is explained in more detail on the basis of the drawings, in which FIGS. 1 A-1 G schematically show the process for pre-assembling a connecting element to a first component part and the process for frictionally-coupling a first and a second component part with a connecting element. FIGS. 1 A-1 B and 1 D-1 G also show a fixing element which is used in these processes.

FIGS. 2 A-2 G schematically show the process for pre-assembling a connecting element to a first component part and the process for frictionally-coupling a first and a second component part with a connecting element. FIGS. 2 A-2 G also show a fixing element which is used in these processes.

FIGS. 4 A-4 B schematically show the process for pre-assembling a connecting element to a first component part and a fixing element which is used in this process.

FIGS. 4 C-4 E show further examples of fixing elements which may be used in the process for pre-assembling a connecting element to a first component part.

DETAILED DESCRIPTION

The hard particles preferably consist of a material which, under the particular conditions of use, does not react chemically either with the materials of the components to be joined or with environmental media. It is preferably an inorganic material.

Preferably, the hard particles are selected from the group consisting of carbides, nitrides, borides, silicon dioxide, aluminum oxide, diamond and mixtures thereof. Examples of carbides are silicon carbide, tungsten carbide and boron carbide, examples of nitrides are silicon nitride and cubic boron nitride. Preferably, diamonds are used as hard particles.

The size of the hard particles is selected in such a way that a sufficient number of particles will interact with the joining surfaces of the components to be joined by being pressed into the surface. Preferably, this is ensured if the particle diameter is greater than two times the peak-to-valley height of the joining surfaces, which peak-to-valley results from machining of the joining surfaces. A mean particle size of 100 μm ($d_{50}$) or less generally fulfils this requirement. Typically, the mean particle size ($d_{50}$) of the hard particles is from 5 to 100 μm.

The hard particles should have a narrow grain size range in which the scatter about a given nominal diameter amounts to no more than about +/−50%. In some embodiments, the scatter about a given nominal diameter should not amount to more than about +/−25%.

The hard particles are protruding from the binder layer.

The number of hard particles per unit surface area of the joining surfaces of the connecting element may be selected in such a way that the normal force which is available for joining the components together is sufficient to ensure that the particles are pressed into the surface of the components to be joined. This will generally be the case if the area percentage of the joining surfaces of the connecting element which is covered with hard particles is from 10% to 80%.

The connecting element comprises a substrate having a first joining surface on one side of the substrate and a second joining surface on an opposite side of the substrate. The substrate may be made from a metallic or a polymeric material.

A suitable metallic material for the substrate is steel, for example unalloyed steel. Also high-alloy steel or stainless steel can be used. Examples for unalloyed steel are grade C75S—1.1248 according to DIN EN 10132-4 or grade C60S—1.1211 according to DIN EN 10132-4.

The polymeric material of the substrate may be in the form of a film, or a tissue or fleece, or a foam.

The thickness of the substrate is selected depending on the application. In some embodiments, the thickness of the substrate is up to 2.0 mm. In other embodiments, the thickness is up to 1.0 or up to 0.5 mm. In some other embodiments, the thickness is up to 0.2 mm, in some other embodiments, the thickness is up to 0.1 mm. For large connecting elements that need to have higher strength and stiffness, for example connecting elements used for parts of wind turbines, a metallic substrate may be used with a thickness of up to 0.5 mm or up to 1.0 mm or up to 2.0 mm. For applications that require a thin connecting element, for example if the design of the components to be joined should not be changed, the thickness of the substrate can be 0.2 mm or less, preferably 0.1 mm.

The first and the second joining surface of the connecting element comprises hard particles fixed on the substrate by a binder layer. The binder layer may be a metallic binder layer or a polymeric binder layer. The metallic binder layer may comprise nickel. The polymeric material of the polymeric binder layer may be selected from the group consisting of epoxy materials, acrylic materials, polyester materials, polyurethane materials, formaldehyde resins, polyvinyl acetate (PVAC) materials, polyvinylchloride (PVC) materials, alkyd resins, silicone materials, rubber materials, fluoropolymers and combinations thereof.

The thickness of the binder layer may be from 1 to 100 μm.

The connecting element may be a flat ring-shaped element.

The connecting element as disclosed herein can be produced by a process comprising:
providing a substrate having a first joining surface on one side of the substrate and a second joining surface on an opposite side of the substrate,
providing hard particles, and
fixing the hard particles on the first and the second joining surface with a binder layer.

The binder layer may be a metallic binder layer and may comprise nickel. The metallic binder layer may be produced by means of an electrodeposition process, for example by an external current-free (=chemical) electroplating process, also called electroless plating process, preferably by an electroless nickel plating process. The hard particles may be applied on the joining surfaces of a metal substrate by means of an electrodeposition process, for example by an electroless nickel plating process, using a chemical nickel bath with dispersed hard particles. Such electrodeposition and electroplating processes are customary in coating technology.

The binder layer may be a polymeric binder layer. The hard particles may be fixed with the polymeric binder layer on the first and the second joining surface by cathodic dip coating.

The first component part may be made from a metallic material or a polymeric material. The metallic material may be steel or aluminum. Suitable steels are, for example, cast steel or engineering steel. For example, the first component part may be made from cast iron materials such as GJS700 or GJS400 or from fine-grained structural steels such as S690QL. The polymeric material may be a fiber reinforced polymeric material.

The component joining surface of the first component part may further comprise a polymeric material. The polymeric material may have the function of corrosion protection and improve the corrosion resistance of the first component part. The polymeric material may be a thermoplastic polymer, a duroplastic polymer or an elastomeric polymer. For example, the polymeric material can be selected from the group consisting of polyester materials, acrylic materials, epoxy materials, formaldehyde resins, polyurethane materials, polyvinylacetate (PVAC) materials, polyvinyl butyral (PVB) materials, polyvinyl chloride (PVC) materials, silicone materials, rubber materials and combinations thereof. An example for acrylic materials are polyacrylates, an example for polyurethane materials are thermoplastic polyurethane (TPU) materials, examples for rubber materials are styrene butadiene rubber, chloroprene rubber and isoprene rubber. For applying the polymeric material on the component joining surface of the first component part, the polymeric material can be coated on the component joining surface. Suitable coating methods are, for example, cathodic dip coating, spray coating, screen printing, tampon printing and inkjet printing.

The connecting element and the first component part have a hole. The hole is provided to accommodate a bolt by which the whole connection of first and second component part is mechanically fixed. The diameter of the hole of the connecting element may be smaller than the diameter of the hole of the first component part. The diameter of the hole of the connecting element may also be larger than the diameter of the hole of the first component part. Typically, the diameter of the hole of the connecting element is as large as the diameter of the hole of the first component part.

For pre-assembling the connecting element to the first component part, a fixing element is provided. The fixing element comprises a first portion and a second portion. The fixing element has a shape that allows the first portion of the fixing element to be inserted into the hole of the connecting element and the hole of the first component part. The first portion of the fixing element has a circumscribed circle with a diameter being larger than the diameter of the hole of the first component part. The second portion of the fixing element has a circumscribed circle with a diameter being larger than the diameter of the hole of the connecting element. The first portion of the fixing element has elastically compressible properties, and the second portion of the fixing element has compressible properties.

For pre-assembling the connecting element to the first component part, the first joining surface of the connecting element is brought into close contact with the joining surface of the first component part, and the hole of the connecting element is aligned with the hole of the first component part. The first portion of the fixing element is inserted into the hole of the connecting element and the hole of the first component part, while the second portion of the fixing element is not inserted into the hole of the connecting element and the hole of the first component part. The inserted first portion of the fixing element exerts a force against the inner lateral surface of the hole of the first component part. This force needs to be large enough to ensure that the fixing element cannot get lost. The second portion of the fixing element, which is not inserted into the hole of the connecting element and the hole of the first component part and which is outside the hole of the connecting element and the hole of the first component part, has a circumscribed circle with a diameter being larger than the diameter of the hole of the connecting element and prevents that the connecting element can get lost.

With the fixing element being inserted into the hole of the connecting element and the hole of the first component part, the connecting element is pre-assembled to the first component part by the fixing element.

The diameter of the circumscribed circle of the first portion of the fixing element may be from 10 to 30% larger than the diameter of the hole of first component part. The diameter of the circumscribed circle of the second portion of the fixing element may be from 10 to 30% larger than the diameter of the hole of the connecting element.

In some embodiments, the diameter of the hole of the connecting element is as large as the diameter of the first component part, and the diameter of the circumscribed circle of the first portion of the fixing element is from 10 to 30% larger than the diameter of the hole of first component part and from 10 to 30% larger than the diameter of the hole of the connecting element, and the diameter of the circumscribed circle of the second portion of the fixing element is from 10 to 30% larger than the diameter of the hole 9 of the connecting element and from 10 to 30% larger than the diameter of the hole of the first component part.

The first portion of the fixing element, having a circumscribed circle with a diameter being larger than the diameter of the hole of the first component part, is elastically compressible to a diameter corresponding to or being smaller than the diameter of the hole of the first component part and the hole of the connecting element.

The second portion of the fixing element, having a circumscribed circle with a diameter being larger than the diameter of the hole of the connecting element, is compressible to a diameter corresponding to or being smaller than the diameter of the hole of the connecting element and the diameter of the hole of the first component part.

The first portion of the fixing element, having a circumscribed circle with a diameter being larger than the diameter of the hole of the first component part, is elastically compressed to a diameter corresponding to or being smaller than the diameter of the hole of the first component part. The first portion of the fixing element is compressed before the first portion of the fixing element is inserted into the hole of the connecting element and the hole of the first component part. The first portion of the fixing element may be compressed manually or with the help of an automated system.

After inserting the first portion of the fixing element, the first portion of the fixing element will try to decompress and will try to regain its original shape, and therefore the first portion of the fixing element that is inside the hole of the first component part will exert a force against the inner lateral surface of the hole of the first component part, ensuring that the fixing element cannot get lost. The second portion of the fixing element, which is not inserted into the hole of the connecting element and the hole of the first component part and which is outside the hole of the connecting element and the hole of the first component part, prevents that the connecting element can get lost. This is achieved as the second portion of the fixing element has a circumscribed circle with a diameter being larger than the diameter of the hole of the connecting element.

The second portion of the fixing element that is not inserted into the connecting element and the first component part may be from 10 to 70% by volume of the fixing element based on the total volume of the fixing element. Preferably, the second portion of the fixing element may be from 10 to 50%, more preferably from 10 to 30%, by volume of the fixing element, based on the total volume of the fixing element.

In some embodiments, the fixing element comprises a material that has elastically compressible properties. The first portion and the second portion of the fixing element may be made from the same material having elastically compressible properties, and both the first portion and the second portion of the fixing element may have elastically compressible properties. The material having elastically compressible properties may be an elastically compressible foam, for example a material as may be used for ear-pins. The elastically compressible foam may be made from polyphenylene ether (PPE) or polyurethane (PU), for example. Any other material having elastically compressible properties may be used. As the material of the fixing element is elastically compressible, it can regain its original form when pressure is released.

In some embodiments, the fixing element is a flexible device having a central pin and at least two legs attached to and arranged around the central pin. Each of the at least two legs has an extension at its uppermost position, the extensions being oriented in radial direction. The second portion of the fixing element comprises the extensions of the at least two legs, the first portion of the fixing element comprises the at least two legs without the extensions. The first portion of the flexible device can be elastically compressed by bending the at least two legs elastically inwards towards the central pin. The first portion of the flexible device is elastically compressible to a diameter corresponding to or being smaller than the diameter of the hole of the first component part and the hole of the connecting element. The second portion of the flexible device can be compressed by bending the extensions of the at least two legs inwards towards the central pin. The second portion of the flexible device is compressible to a diameter corresponding to or being smaller than the diameter of the hole of the connecting element and the diameter of the hole of first component part.

The flexible device may be made from a metallic material, such as steel, or from a polymeric material, such as polyethylene or polypropylene.

The first portion of the flexible device is elastically compressed by bending the at least two legs of the flexible device elastically inwards towards the central pin before inserting the first portion of the flexible device into the hole of the connecting element and the hole of the first component part. As the at least two legs may be bent elastically inwards towards the central pin, the first portion of the flexible device has elastically compressible properties. The first portion of the flexible device is inserted into the hole of the connecting element and the hole of the first component part, and the flexible device is moved towards the connecting element and the first component part. Preferably, the flexible device is moved towards the connecting element and the first component part against the stop of the flexible device which is given by the extensions at the uppermost positions of the at least two legs of the flexible device. The second portion of the flexible device, which comprises the extensions at the uppermost positions of the at least two legs of the flexible device, is not inserted into the hole of the connecting element and the hole of the first component part.

After inserting the first portion of the flexible device into the hole of the connecting element and the hole of the first component part, the at least two legs of the flexible device will try to regain their original shape and therefore will exert a reset force against the inner lateral surface of the hole of the first component part, ensuring that the flexible device cannot get lost.

The second portion of the flexible device which comprises the extensions of the at least two legs, and which is not inserted into the hole of the connecting element and the hole of the first component part and which is outside the hole of the connecting element and the hole of the first component part, has a circumscribed circle with a diameter being larger than the diameter of the hole of the connecting element and prevents that the connecting element can get lost.

With the flexible device being inserted into the hole of the connecting element and the hole of the first component part, the connecting element is pre-assembled to the first component part by the flexible device.

The central pin of the flexible device may be protruding from the plane which is defined by the upper ends in axial direction of the extensions of the at least two legs of the flexible device.

In some embodiments, the central pin may also comprise three or more pins which are connected with one another.

Further disclosed herein is also a process for frictionally-coupling a first component part and a second component part with a connecting element, the process comprising pre-assembling the connecting element to the first component part by the process disclosed herein, providing a second component part having a component joining surface and a hole, providing a bolt with dimensions such that it can be inserted into the hole of the first component part and the hole of the second component part and into the hole of the connecting element, aligning the hole of the second component part with the hole of the connecting element and the hole of the first component part, inserting the bolt into the hole of the second component part, inserting the bolt into the hole of the connecting element and the hole of the first component part and removing the fixing element from the hole of the connecting element and moving the fixing element completely into the hole or out of the hole of the first component part, bringing the second joining surface of the connecting element into close contact with the joining surface of the second component part, pressing the hard particles of the first joining surface of the connecting element into the component joining surface of the first component part, pressing the hard particles of the second joining surface of the connecting element into the component joining surface of the second component part, and mechanically fixing the bolt, thereby frictionally-coupling the first component part and the second component part with the connecting element.

For frictionally-coupling a first and a second component part with a connecting element, after pre-assembling a connecting element to a first component part by the process disclosed herein, a second component part having a component joining surface and a hole is provided. The hole is provided to accommodate a bolt by which the whole connection of first and second component part is mechanically fixed. The diameter of the hole of the second component part may be larger than the diameter of the hole of the first component part. The diameter of the hole of the second component part may be larger than the diameter of the hole of the connecting element. Usually, the diameter of the hole of the second component part is as large as the diameter of the hole of the first component part and as large as the diameter of the hole of the connecting element.

Furthermore, for frictionally-coupling a first and a second component part with a connecting element, a bolt is provided with dimensions such that it can be inserted into the hole of the first and second component part and into the hole of the connecting element. The bolt is provided for mechanically fixing the connection of the first and second component part and the connecting element. Usually, the bolt is provided with a thread. The hole of the second component part is aligned with the hole of the connecting element and the hole of the first component part. Then the bolt is inserted into the hole of the second component part, and then the bolt is also inserted into the hole of the connecting element and the hole of the first component part. By inserting the bolt into the hole of the connecting element and the hole of the first component part, the fixing element is removed from the hole of the connecting element, and the fixing element is moved completely into the hole or out of the hole of the first component part. The second joining surface of the connecting element is brought into close contact with the joining surface of the second component part. The hard particles of the first joining surface of the connecting element are pressed into the component joining surface of the first component part, and the hard particles of the second joining surface of the connecting element are pressed into the component joining surface of the second component part, and the bolt is mechanically fixed. Thereby, the first component part and the second component part are frictionally coupled with the connecting element.

The second component part may be made from a metallic material or a polymeric material. The metallic material may be steel or aluminum. Suitable steels are, for example, cast steel or engineering steel. For example, the first component part may be made from cast iron materials such as GJS700 or GJS400 or from fine-grained structural steels such as S690QL. The polymeric material may be a fiber reinforced polymeric material.

The component joining surface of the second component part may further comprise a polymeric material. The polymeric material may have the function of corrosion protection and improve the corrosion resistance of the first component part. The polymeric material may be a thermoplastic polymer, a duroplastic polymer or an elastomeric polymer. For example, the polymeric material can be selected from the group consisting of polyester materials, acrylic materials, epoxy materials, formaldehyde resins, polyurethane materials, polyvinylacetate (PVAC) materials, polyvinyl butyral (PVB) materials, polyvinyl chloride (PVC) materials, silicone materials, rubber materials and combinations thereof. An example for acrylic materials are polyacrylates, an example for polyurethane materials are thermoplastic polyurethane (TPU) materials, examples for rubber materials are styrene butadiene rubber, chloroprene rubber and isoprene rubber. For applying the polymeric material on the component joining surface of the second component part, the polymeric material can be coated on the component joining surface. Suitable coating methods are, for example, cathodic dip coating, spray coating, screen printing, tampon printing and inkjet printing.

In some embodiments of the process for frictionally-coupling a first and a second component part with a connecting element, the second portion of the fixing element is inserted into the hole of the second component part, after pre-assembling the connecting element to the first component part and before the bolt is inserted into the hole of the second component part. Before inserting the second portion of the fixing element into the hole of the second component part, the second portion of the fixing element is compressed to a diameter that corresponds to or is smaller than the diameter of the hole of the second component part. For example, the second portion of the fixing element may be inserted into the hole of the second component part in embodiments with the fixing element comprising a material having elastically compressible properties, such as an elastically compressible foam.

In some embodiments of the process for frictionally-coupling a first and a second component part with a connecting element, the second portion of the fixing element is not inserted into the hole of the second component part. For example, the second portion of the fixing element is not inserted into the hole of the second component part in embodiments with the fixing element being a flexible device as described above, the flexible device having a central pin and at least two legs attached to and arranged around the central pin, wherein each of the at least two legs has an extension at its uppermost position, the extensions being oriented in radial direction.

In embodiments with the central pin of the flexible device protruding from the plane which is defined by the upper ends in axial direction of the extensions of the at least two legs of the flexible device, the bolt, which is inserted into the second component part, the connecting element and the first component part, will exert a force on the central pin, but will not exert a force on the extensions of the at least two legs. By exerting a force on the central pin, the extensions of the at least two legs are compressed towards the central pin. The extensions of the at least two legs are compressed to a diameter corresponding to or being smaller than the diameter of the hole of the connecting element and the diameter of the hole of the first component part. This makes it possible that the second portion of the flexible device, which comprises the extensions of the at least two legs of the flexible device, can be moved completely into the hole or out of the hole of the first component part.

Figure 3:
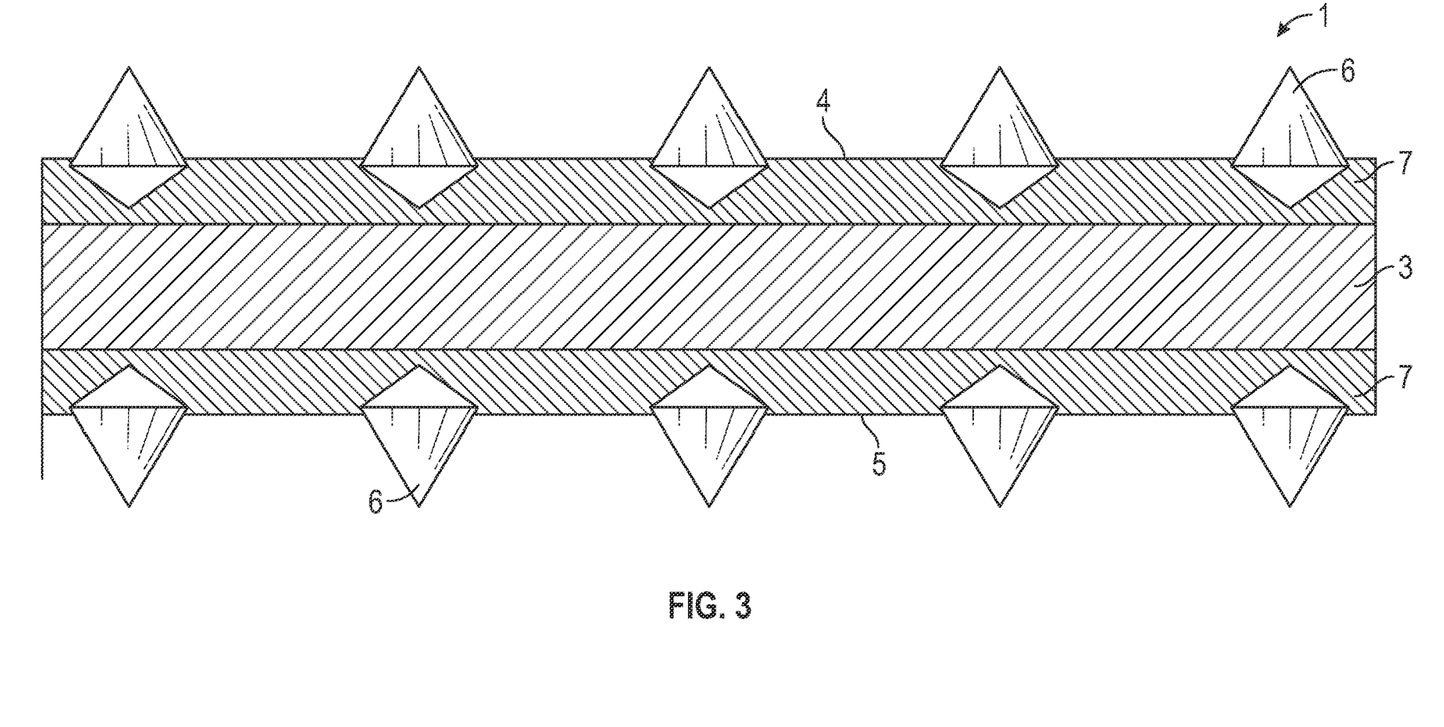
FIG. 3 shows a cross-sectional view of a connecting element as used herein in the process for pre-assembling a connecting element to a first component part and in the process for frictionally-coupling a first and a second component part with a connecting element.

FIGS. 1 A-1 D schematically show the process for pre-assembling a connecting element to a first component part, using a first embodiment of a fixing element. FIG. 1 A shows a cross-sectional view in axial direction of a connecting element 1, a first component part 2 and a fixing element 11. FIG. 1 B shows a plan view of the fixing element 11 perpendicular to the axial direction. FIG. 1 C shows a plan view of the connecting element 1 perpendicular to the axial direction. The connecting element 1 is an annular flat element having a hole 9. FIG. 3 shows a cross-sectional view in axial direction of the connecting element 1 in more detail. The connecting element 1 comprises a substrate 3 having a first joining surface 4 on one side of the substrate 3 and a second joining surface 5 on an opposite side of the substrate 3. Each joining surface 4, 5 comprises hard particles 6 fixed on the substrate 3 by a binder layer 7. The first component part 2 has a joining surface 8 and a hole 10 (see FIG. 1 A). The diameter of the hole 9 of the connecting element 1 corresponds to the diameter of the hole 10 of the first component part 2. The fixing element 11 is provided for pre-assembling the connecting element 1 to the first component part 2. The fixing element 11 comprises a first portion 23 and a second portion 24. The fixing element 11 has a shape that allows the first portion 23 of the fixing element 11 to be inserted into the hole 9 of the connecting element 1 and the hole 10 of the first component part 2 (see FIG. 1 D). The fixing element 11 is made of a material that has elastically compressible properties. It may be an elastically compressible foam, for example from a material as may be used for ear-pins. The elastically compressible foam may be made from polyphenylene ether (PPE) or polyurethane (PU), for example. As the material of the fixing element is elastically compressible, it can regain its original form when pressure is released. The first portion 23 of the fixing element 11 has a circumscribed circle 13 with a diameter being larger than the diameter of the hole 10 of the first component part 2 (see FIGS. 1 A, 1 B). The first portion 23 of the fixing element 11 has elastically compressible properties. For pre-assembling the connecting element 1 to the first component part 2, the first joining surface 4 of the connecting element 1 is brought into close contact with the joining surface 8 of the first component part 2, and the hole 9 of the connecting element 1 is aligned with the hole 10 of the first component part 2 (see FIG. 1 D). The first portion 23 of the fixing element 11 is inserted into the hole 9 of the connecting element 1 and the hole 10 of the first component part 2 (see FIG. 1 D). Before inserting the first portion 23 of the fixing element 11 into the hole 9 of the connecting element 1 and the hole 10 of the first component part 2, the first portion 23 of the fixing element 11 is compressed to a diameter corresponding to or being smaller than the diameter of the hole 10 of the first component part 2. The second portion 24 of the fixing element 11 is not inserted into the hole 9 of the connecting element 1 and the hole 10 of the first component part 2 and is outside of the connecting element 1 and the first component part 2 (FIG. 1 D).

Figure 1A:
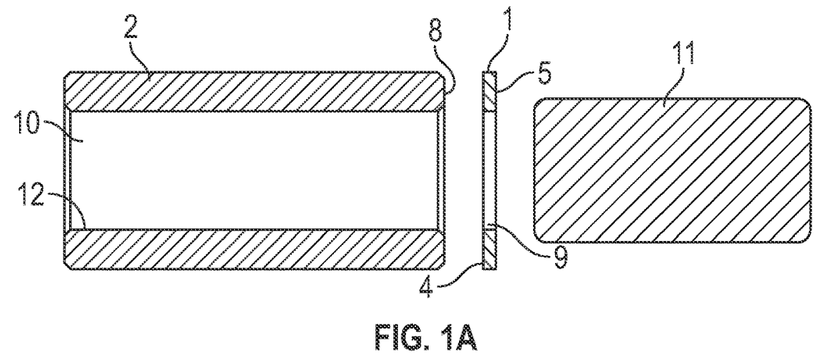
Figure 1B:
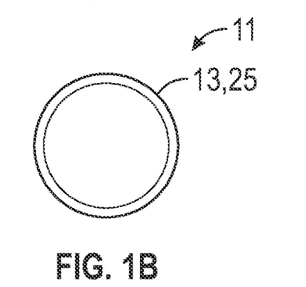
Figure 1C:
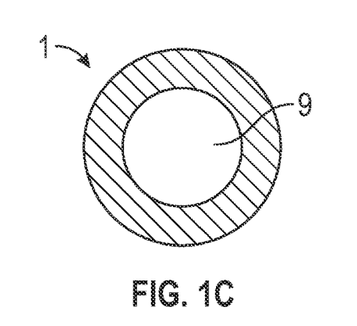
Figure 1D:
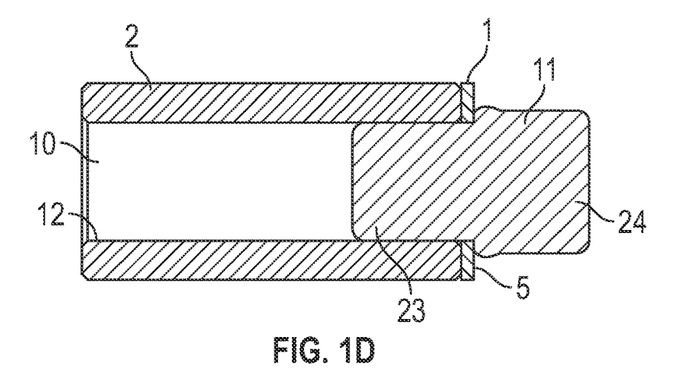
Figure 1E:
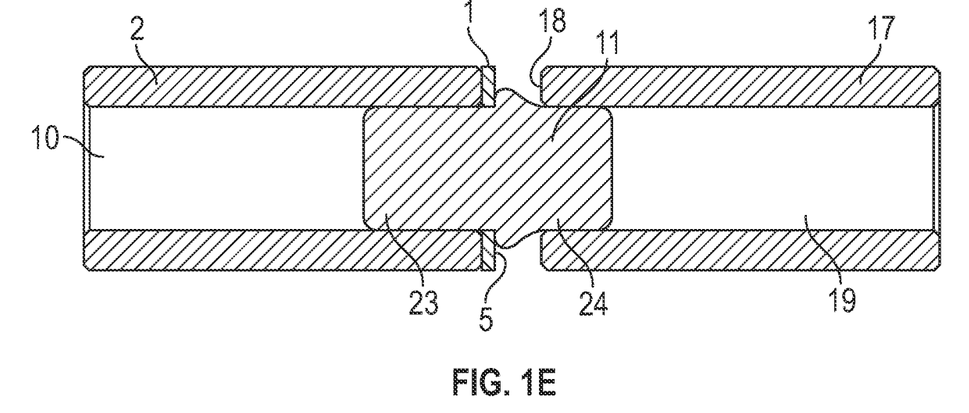
Figure 1F:
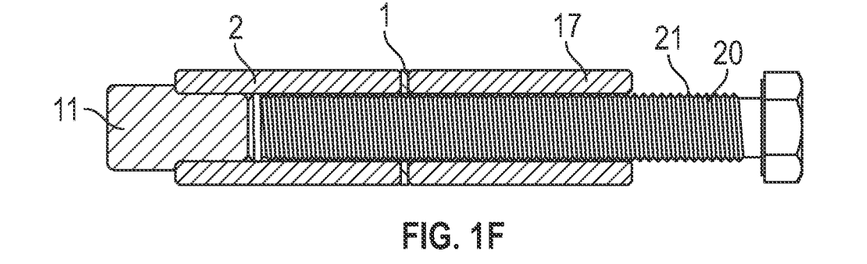
Figure 1G:
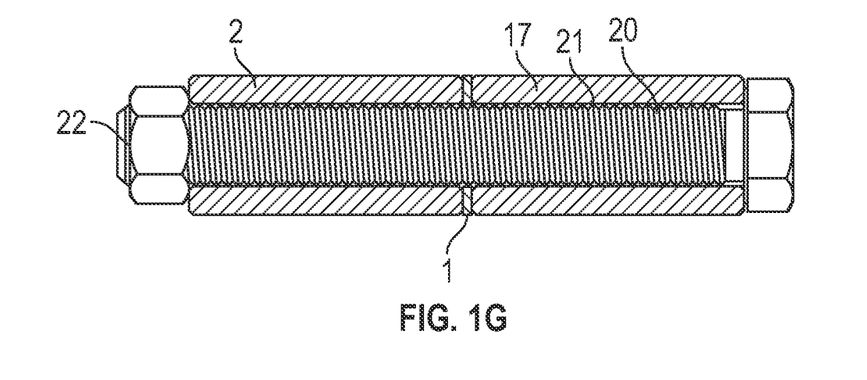

After inserting the first portion 23 of the fixing element 11, the inserted first portion 23 of the fixing element 11 will try to decompress and regain its original shape, and therefore the first portion 23 of the fixing element 11 that is inside the hole 10 of the first component part 2 will exert a force against the inner lateral surface 12 of the hole 10 of the first component part 2, ensuring that the fixing element cannot get lost. The second portion 24 of the fixing element 11, which is not inserted into the hole 9 of the connecting element 1 and the hole 10 of the first component part 2 and which is outside the hole 9 of the connecting element 1 and the hole 10 of the first component part 2, prevents that the connecting element can get lost. This is achieved as the second portion 24 of the fixing element has a circumscribed circle 25 with a diameter being larger than the diameter of the hole 9 of the connecting element 1 (see FIGS. 1 A, 1 B, 1 D). Thereby, the connecting element 1 is pre-assembled to the first component 2 part by the fixing element 11.

FIGS. 1 E-1 G schematically show the process for frictionally-coupling a first and a second component part with a connecting element, using the first embodiment of a fixing element as shown in FIGS. 1 A and 1 B. First, the connecting element 1 is pre-assembled to the first component part 2 as described before and as can be seen in FIGS. 1 A-1 D. After pre-assembling the connecting element 1 to the first component part 2, a second component part 17 having a component joining surface 18 and a hole 19 is provided. The diameter of the hole 19 of the second component part 17 is as large as the diameter of the hole 10 of the first component part 2 and as large as the diameter of the hole 9 of the connecting element 1. Also, a bolt 20 is provided with dimensions such that it can be inserted into the hole 10 of the first component part 2 and the hole 19 of the second component part 17 and into the hole 9 of the connecting element 1 (see FIGS. 1 F-1 G). The bolt is usually provided with a thread 21. As can be seen from FIG. 1 E, the hole 19 of the second component part 17 is aligned with the hole 9 of the connecting element 1 and the hole 10 of the first component part 2. The second portion 24 of the fixing element 11 that is, after pre-assembling, outside of the connecting element 1 and the first component part 2, is inserted into the hole 19 of the second component part 17 (see FIG. 1 E). Before inserting the second portion 24 of the fixing element 11 into the hole 19 of the second component part 17, the second portion 24 of the fixing element 11, which has compressible properties, is compressed to a diameter that corresponds to or is smaller than the diameter of the hole 19 of the second component part 17. Then the bolt 20 is inserted into the hole 19 of the second component part 17. The bolt 20 is then also inserted into the hole 9 of the connecting element 1 and the hole 10 of the first component part 2 (FIG. 1 F). By inserting the bolt 20 into the hole 19 of the second component part 17, into the hole 9 of the connecting element 1 and into the hole 10 of the first component part 2, the fixing element 11 is removed from the hole 19 of the second component part 17 and the hole 9 of the connecting element 1. The fixing element 11 is moved into the hole of the first component part 2. By further moving the bolt 20 into the first component part 2, the fixing element 11 is moved out of the hole 10 of the first component part 2. In FIG. 1 F, the fixing element 11 is still partially inside the hole 10 of the first component part 2. By completely inserting the bolt 20 into the second component part 17, the connecting element 1 and the first component part 2, the fixing element 11 is moved completely out of the hole 10 of the first component part 2 (FIG. 1 G). The hole 10 of the first component part 2 may also be a blind hole and not have an opening at the end of the hole 10 which is opposite to the joining surface 8 of the first component 2. In this case, the fixing element 11 is moved completely into the hole 10 of the first component part 2. The second joining surface 5 of the connecting element 1 is brought into close contact with the joining surface 18 of the second component part 17. The hard particles of the first joining surface 4 of the connecting element 1 are pressed into the component joining surface 8 of the first component part 2, and the hard particles of the second joining surface 5 of the connecting element 1 are pressed into the component joining surface 18 of the second component part 17. The bolt 20 is mechanically fixed, usually with a nut 22 having an inner thread. The inner lateral surface 12 of the hole 10 of the first component part 2 and the inner lateral surface of the hole 19 of the second component part 17 are usually provided with a thread which engages with the thread 21 of the bolt 20. By pressing the hard particles of the first joining surface 4 of the connecting element 1 into the component joining surface 8 of the first component part 2, and by pressing the hard particles of the second joining surface 5 of the connecting element 1 into the component joining surface 18 of the second component part 17, and by mechanically fixing the bolt 20, the first component part 2 and the second component part 17 are frictionally coupled with the connecting element 1.

FIGS. 2 A-2 D schematically show the process for pre-assembling a connecting element to a first component part, using a second embodiment of a fixing element. FIG. 2 A shows a cross-sectional view in axial direction of a connecting element 1, a first component part 2 and a fixing element 11. FIG. 2 B shows a plan view of the fixing element 11, the connecting element 1 and the first component part 2 perpendicular to the axial direction. The cross-sectional view of FIG. 2 A is along the sectional line denoted by "2A" in FIG. 2 B. The connecting element 1 is an annular flat element having a hole 9. A plan view of the connecting element perpendicular to the axial direction can be seen in FIG. 1 C. FIG. 3 shows a cross-sectional view in axial direction of the connecting element 1 in more detail. The connecting element 1 comprises a substrate 3 having a first joining surface 4 on one side of the substrate 3 and a second joining surface 5 on an opposite side of the substrate 3. Each joining surface 4, 5 comprises hard particles 6 fixed on the substrate 3 by a binder layer 7. The first component part 2 has a joining surface 8 and a hole 10 (see FIG. 2 A). The diameter of the hole 9 of the connecting element 1 corresponds to the diameter of the hole 10 of the first component part 2. The fixing element 11 is provided for pre-assembling the connecting element 1 to the first component part 2. The fixing element 11 comprises a first portion 23 and a second portion 24. The fixing element 11 has a shape that allows the first portion 23 of the fixing element to be inserted into the hole 9 of the connecting element 1 and the hole 10 of the first component part 2. The first portion 23 of the fixing element 11 has a circumscribed circle 13 with a diameter being larger than the diameter of the hole 10 of the first component part 2. The second portion 24 of the fixing element has a circumscribed circle 25 with a diameter being larger than the diameter of the hole 9 of the connecting element 1 (see FIG. 2 B). The fixing element 11 is a flexible device having a central pin 14 and three legs 15 attached to and arranged around the central pin 14. Each of the three legs 15 has an extension 16 at its uppermost position, the extensions 16 being oriented in radial direction. The second portion 24 of the fixing element 11 comprises the extensions 16 of the three legs 15, the first portion 23 of the fixing element 11 comprises the three legs 15 without the extensions 16. The first portion 23 of the fixing element also comprises the lower part of the central pin 14, the second portion 24 of the fixing element also comprises the upper part of the central pin 14 (see FIG. 2 A). The first portion 23 of the flexible device 11 is elastically compressible, it can be compressed by bending the three legs 15 elastically inwards towards the central pin 14. The flexible device 11 may be made from a metallic or a polymeric material. The central pin 14 of the flexible device 11 is protruding from the plane which is defined by the upper ends in axial direction of the extensions 16 of the three legs 15 of the fixing element 11.

FIG. 2 D shows a plan view of the fixing element 11, the connecting element 1 and the first component part 2 as shown in FIG. 2 C, perpendicular to the axial direction. The cross-sectional view of FIG. 2 C is along the sectional line denoted by "2 C" in FIG. 2 D. For pre-assembling the connecting element 1 to the first component part 2, the first joining surface 4 of the connecting element 1 is brought into close contact with the joining surface 8 of the first component part 2 and the hole 9 of the connecting element 1 is aligned with the hole 10 of the first component part 2 (see FIG. 2 C). The first portion 23 of the fixing element 11 is inserted into the hole 9 of the connecting element 1 and the hole 10 of the first component part 2 (see FIG. 2 C). Before inserting the first portion 23 of the fixing element 11 into the hole 9 of the connecting element 1 and the hole 10 of the first component part 2, the first portion 23 of the flexible device 11 is compressed by bending the three legs 15 of the flexible device 11 elastically inwards towards the central pin 14. The flexible device 11 is moved towards the connecting element 1 and the first component part 2 against the stop of the flexible device 11 which is given by the extensions 16 at the uppermost positions of the three legs 15 of the flexible device 11. The second portion 24 of the flexible device 11, which comprises the extensions 16 at the uppermost positions of the three legs 15 of the flexible device 11, is not inserted into the hole 9 of the connecting element 1 and the hole 10 of the first component part 2.

Figure 2A:
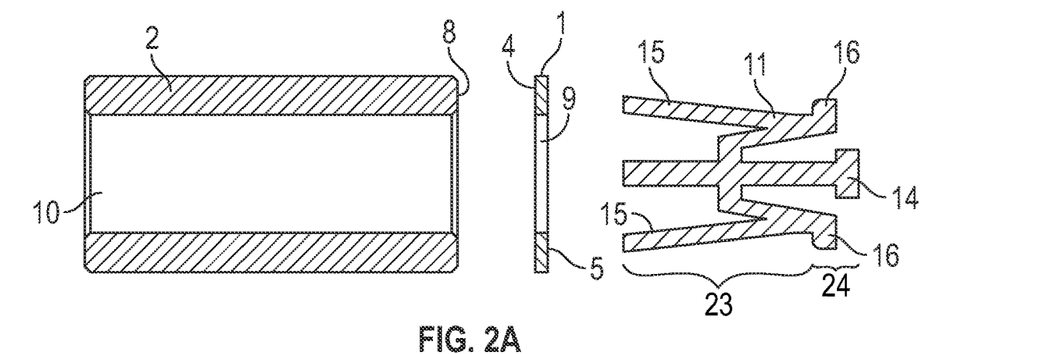
Figure 2B:
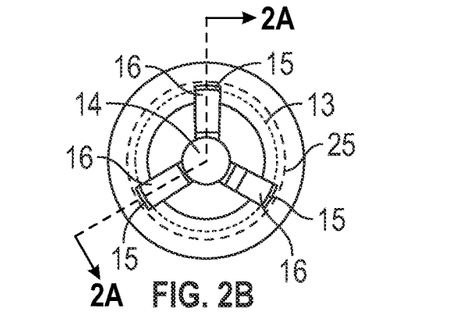
Figure 2C:
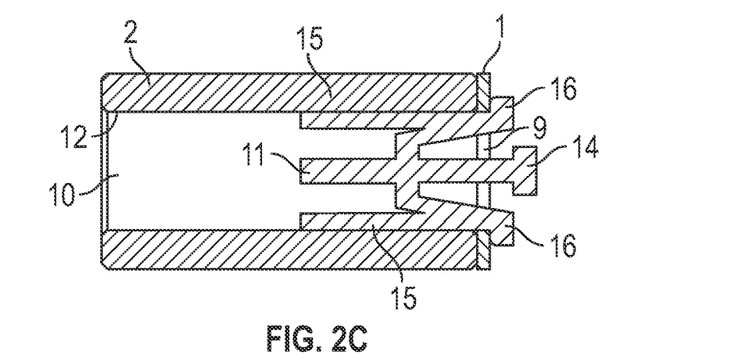
Figure 2D:
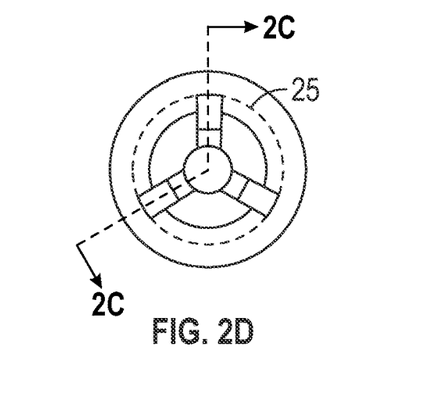
Figure 2E:
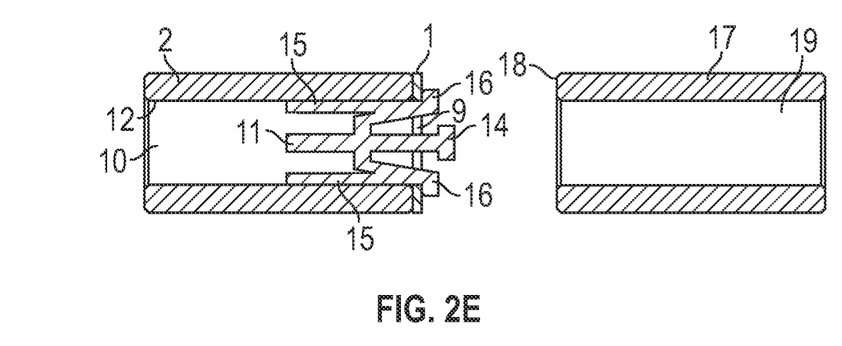
Figure 2F:
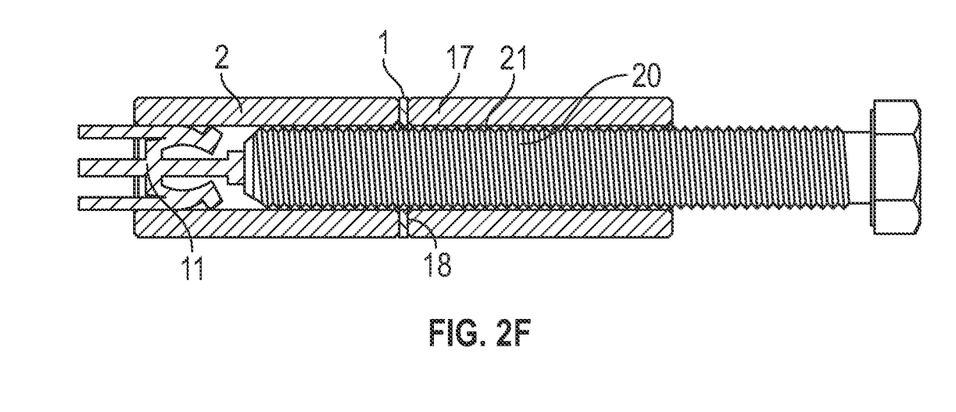
Figure 2G:
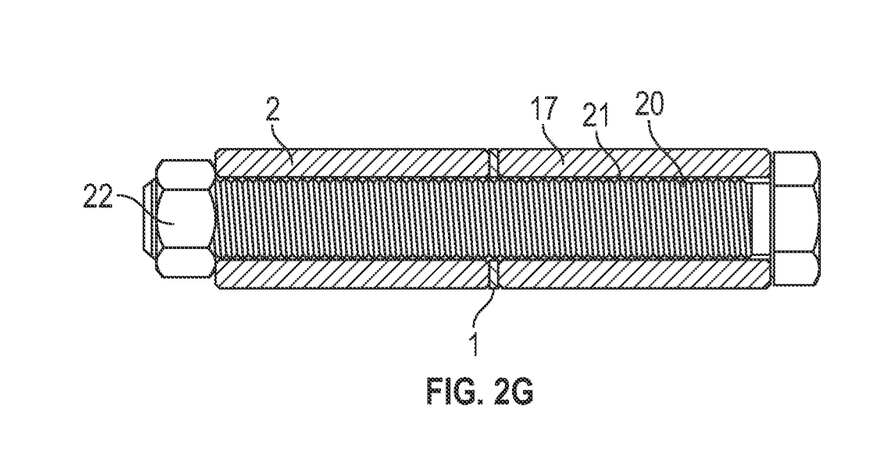

After inserting the first portion 23 of the flexible device 11 into the hole 9 of the connecting element 1 and the hole 10 of the first component part 2, the three legs 15 of the flexible device 11 will try to regain their original shape and therefore will exert a reset force against the inner lateral surface 12 of the hole 10 of the first component part 2, ensuring that the flexible device 11 cannot get lost. The second portion 24 of the fixing element 11, which is not inserted into the hole 9 of the connecting element 1 and the hole 10 of the first component part 2 and which is outside the hole 9 of the connecting element 1 and the hole 10 of the first component part 2, prevents that the connecting element can get lost. This is achieved as the second portion 24 of the fixing element 11, more specifically the extensions 16 of the three legs 15, has a circumscribed circle 25 with a diameter being larger than the diameter of the hole 9 of the connecting element 1 (see FIGS. 2 C, 2 D). Thereby, the connecting element 1 is pre-assembled to the first component 2 part by the fixing element 11 (FIG. 2 C).

FIGS. 2 E-2 F schematically shows the process for frictionally-coupling a first and a second component part with a connecting element, using the second embodiment of a fixing element as shown in FIGS. 2 A-2 D. First, the connecting element 1 is pre-assembled to the first component part 2 as described before and as can be seen in FIGS. 2 A-2 D. After pre-assembling the connecting element 1 to the first component part 2, a second component part 17 having a component joining surface 18 and a hole 19 is provided (FIG. 2 E). The diameter of the hole 19 of the second component part 17 is as large as the diameter of the hole 10 of the first component part 2 and as large as the diameter of the hole 9 of the connecting element 1. Also a bolt 20 is provided with dimensions such that it can be inserted into the hole 10 of the first component part 2 and the hole 19 of the second component part 17 and into the hole 9 of the connecting element 1 (see FIG. 2 F, showing the situation where the bolt 20 has already been inserted into the hole 19). The bolt 20 is usually provided with a thread 21. The hole 19 of the second component part 17 is aligned with the hole 9 of the connecting element 1 and the hole 10 of the first component part 2. The bolt 20 is inserted into the hole 19 of the second component part 17. The bolt 20 is also inserted into the hole 9 of the connecting element 1 and the hole 10 of the first component part 2 (FIG. 2 F). By inserting the bolt 20 into the hole 9 of the connecting element 1 and into the hole 10 of the first component part 2, the bolt 20 exerts a force on the central pin 14 of the fixing element 11. The second portion 24 of the flexible device 11, comprising the extensions 16 of the three legs 15, is compressible. By exerting a force against the central pin 14, the bolt 20 causes the extensions 16 of the three legs 15 to be compressed towards the central pin 14. The extensions 16 of the three legs 15 are compressed to a diameter corresponding to or being smaller than the diameter of the hole 9 of the connecting element 1 and the diameter of the hole 10 of the first component part 2. This makes it possible that the second portion 24 of the flexible device 11, which comprises the extensions 16 of the three legs 15 of the flexible device 11, can be removed from the hole 9 of the connecting element and can be moved completely into the hole 10 of the first component part. After the bolt 20 has been completely inserted into the second component part 17, the connecting element 1 and the first component part 2, the fixing element 11 is moved completely out of the hole 10 of the first component part 2. In FIG. 2 F, the fixing element 11 is still partially inside the hole 10 of the first component part 2. The hole 10 of the first component part 2 may also be a blind hole and not have an opening at the end of the hole 10 which is opposite to the joining surface 8 of the first component 2. In this case, the fixing element 11 is moved completely into the hole 10 of the first component part 2. The second joining surface 5 of the connecting element 1 is brought into close contact with the joining surface 18 of the second component part 17. The hard particles of the first joining surface 4 of the connecting element 1 are pressed into the component joining surface 8 of the first component part 2, and the hard particles of the second joining surface 5 of the connecting element 1 are pressed into the component joining surface 18 of the second component part 17. The bolt 20 is mechanically fixed, usually with a nut 22 having an inner thread. The inner lateral surface 12 of the hole 10 of the first component part 2 and the inner lateral surface of the hole 19 of the second component part 17 are usually provided with a thread which engages with the thread 21 of the bolt 20. By pressing the hard particles of the first joining surface 4 of the connecting element 1 into the component joining surface 8 of the first component part 2, and by pressing the hard particles of the second joining surface 5 of the connecting element 1 into the component joining surface 18 of the second component part 17, and by mechanically fixing the bolt 20, the first component part 2 and the second component part 17 are frictionally coupled with the connecting element 1 (FIG. 2 G).

FIGS. 4 A-4 B schematically show the process for pre-assembling a connecting element to a first component part, using a further embodiment of a fixing element. FIG. 4 A shows a cross-sectional view in axial direction of a connecting element 1, a first component part 2 and a fixing element 11. The connecting element 1 is an annular flat element having a hole 9. A plan view of the connecting element perpendicular to the axial direction can be seen in FIG. 1 C, a cross-sectional view in axial direction of the connecting element 1 in more detail can be seen in FIG. 3. The first component part 2 has a joining surface 8 and a hole 10 (see FIG. 1 A). The diameter of the hole 9 of the connecting element 1 corresponds to the diameter of the hole 10 of the first component part 2. The fixing element 11 is provided for pre-assembling the connecting element 1 to the first component part 2. The fixing element 11 comprises a first portion 23 and a second portion 24. The fixing element 11 has a shape that allows the first portion 23 of the fixing element 11 to be inserted into the hole 9 of the connecting element 1 and the hole 10 of the first component part 2 (see FIG. 1 D). The fixing element 11 is made of a material that has elastically compressible properties. It may be an elastically compressible foam, for example from a material as may be used for ear-pins. The elastically compressible foam may be made from polyphenylene ether (PPE) or polyurethane (PU), for example. As the material of the fixing element is elastically compressible, it can regain its original form when pressure is released. The first portion 23 of the fixing element 11 has a circumscribed circle with a diameter being larger than the diameter of the hole 10 of the first component part 2. The first portion 23 of the fixing element 11 has elastically compressible properties. For pre-assembling the connecting element 1 to the first component part 2, the first joining surface 4 of the connecting element 1 is brought into close contact with the joining surface 8 of the first component part 2, and the hole 9 of the connecting element 1 is aligned with the hole 10 of the first component part 2 (see FIGS. 4 A and 4 B). The first portion 23 of the fixing element 11 is inserted into the hole 9 of the connecting element 1 and the hole 10 of the first component part 2 (see FIG. 4 B). Before inserting the first portion 23 of the fixing element 11 into the hole 9 of the connecting element 1 and the hole 10 of the first component part 2, the first portion 23 of the fixing element 11 is compressed to a diameter corresponding to or being smaller than the diameter of the hole 10 of the first component part 2. The second portion 24 of the fixing element 11 is not inserted into the hole 9 of the connecting element 1 and the hole 10 of the first component part 2 and is outside of the connecting element 1 and the first component part 2 (FIG. 4 B).

Figure 4A:
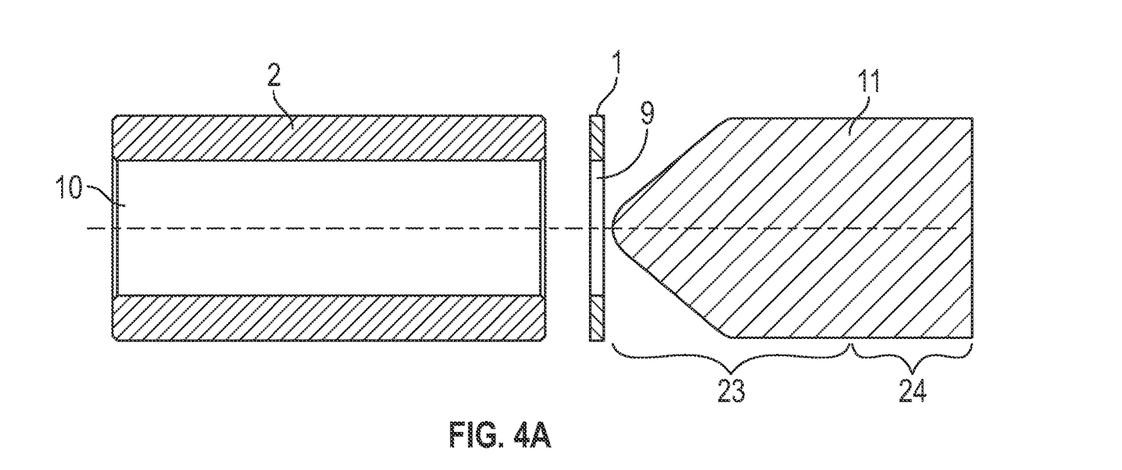
Figure 4B:
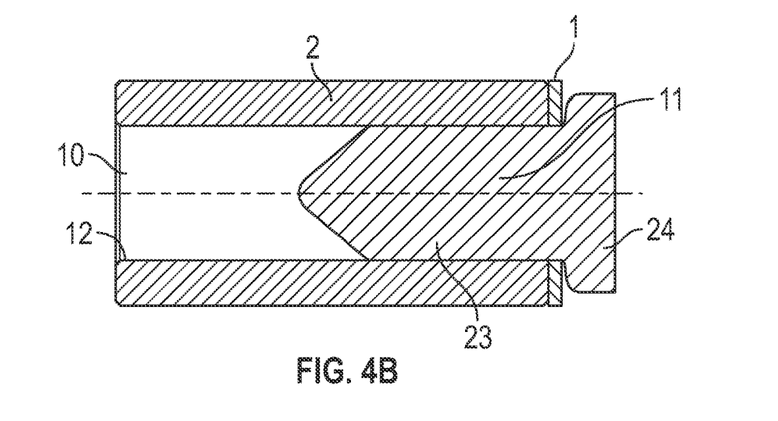
Figure 4C:
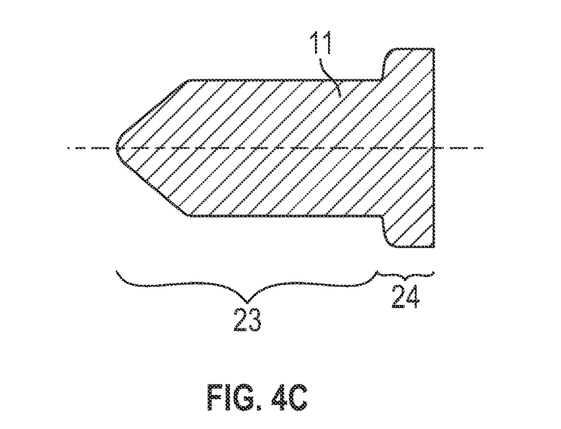
Figure 4D:
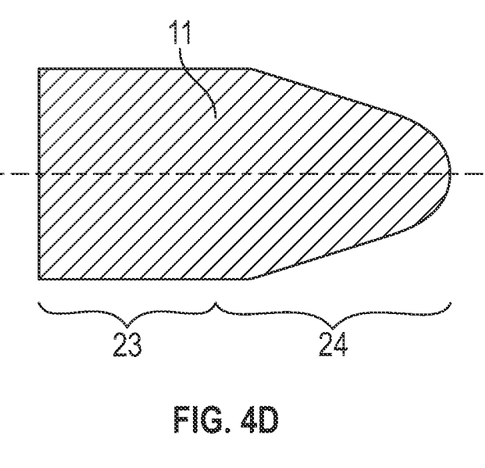
Figure 4E:
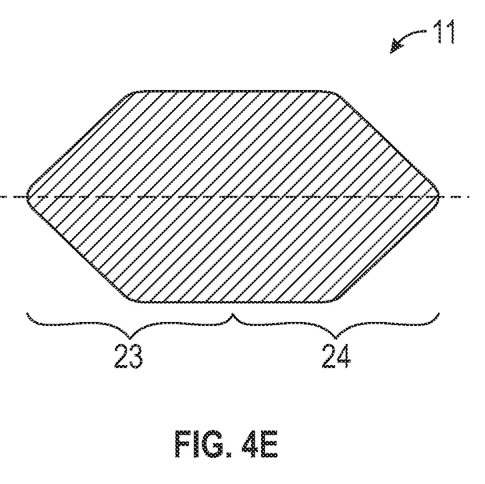

After inserting the first portion 23 of the fixing element 11, the inserted first portion 23 of the fixing element 11 will try to decompress and regain its original shape, and therefore the first portion 23 of the fixing element 11 that is inside the hole 10 of the first component part 2 will exert a force against the inner lateral surface 12 of the hole 10 of the first component part 2, ensuring that the fixing element cannot get lost. The second portion 24 of the fixing element 11, which is not inserted into the hole 9 of the connecting element 1 and the hole 10 of the first component part 2 and which is outside the hole 9 of the connecting element 1 and the hole 10 of the first component part 2, prevents that the connecting element can get lost. This is achieved as the second portion 24 of the fixing element has a circumscribed circle with a diameter being larger than the diameter of the hole 9 of the connecting element 1 (see FIGS. 4 A, 4 B). Thereby, the connecting element 1 is pre-assembled to the first component 2 part by the fixing element 11.

FIGS. 4 C-4 E show further examples of fixing elements which may be used in the process for pre-assembling a connecting element to a first component part. The fixing elements 11 of FIGS. 4 C-4 E are made of a material that has elastically compressible properties. It may be an elastically compressible foam, for example from a material as may be used for ear-pins. The elastically compressible foam may be made from polyphenylene ether (PPE) or polyurethane (PU), for example. As the material of the fixing element is elastically compressible, it can regain its original form when pressure is released. The fixing element 11 of FIGS. 4 C-4 E can be used for the process for pre-assembling a connecting element to a first component part, and for the process for frictionally-coupling the first component part and a second component part with the connecting element, as described above for the fixing element used in FIGS. 1 A-1 G. The first portion 23 of the fixing elements 11 of FIGS. 4 C-4 E has a circumscribed circle with a diameter being larger than the diameter of the hole of the first component part. The second portion 24 of the fixing element 11 has a circumscribed circle with a diameter being larger than the diameter of the hole of the connecting element.

Further disclosed herein is also a frictional connection comprising a first component part having a component joining surface, a second component part having a component joining surface, and a connecting element, wherein the first and second component part are frictionally coupled with the connecting element by the process as disclosed herein.

The frictional connection as disclosed herein can be used to connect a first component part and a second component part to be joined in machine, plant and motor vehicle construction and energy generation. The frictional connection disclosed herein can be used for friction-increasing connection of a first component part and a second component part to be joined in machine, plant and motor vehicle construction and energy generation. The frictional connection disclosed herein can be used for friction-increasing, play-free and/or reversible connection of a first and a second component part to be joined in machine, plant and motor vehicle construction and energy generation.

In principle, the frictional connection as disclosed herein can be used for any type of frictional connection throughout the field of mechanical engineering, and in particular, if the forces which can be transmitted by the component surfaces which are imposed by the design are insufficient.

For example, the frictional connection as disclosed herein can be used for bolted or clamped connections, between parts or components of vehicles, such as subframe and undercarriage, or crankshaft and sprocket, or in camshaft applications, or axle or damper applications, or between parts or components of wind turbines, such as segmented towers or rotor hub and rotor shaft.

The invention claimed is:

1. A process for pre-assembling a connecting element to a first component part, comprising providing a connecting element and a first component part, wherein the connecting element comprises a substrate having a first joining surface on one side of the substrate and a second joining surface on an opposite side of the substrate, wherein each joining surface comprises hard particles fixed on the substrate by a binder layer, and wherein the first component part has a joining surface, and wherein the connecting element has a hole and wherein the first component part has a hole, providing a fixing element for pre-assembling the connecting element to the first component part, wherein the fixing element comprises a first portion and a second portion and wherein the fixing element has a shape that allows the first portion of the fixing element to be inserted into the hole of the connecting element and the hole of the first component part, and wherein the first portion of the fixing element has a circumscribed circle with a diameter being larger than the diameter of the hole of the first component part, and wherein the second portion of the fixing element has a circumscribed circle with a diameter being larger than the diameter of the hole of the connecting element, and wherein the first portion of the fixing element has elastically compressible properties, and wherein the second portion of the fixing element has compressible properties, bringing the first joining surface of the connecting element into close contact with the joining surface of the first component part and aligning the hole of the connecting element with the hole of the first component part, and inserting the first portion of the fixing element into the hole of the connecting element and the hole of the first component part, wherein the second portion of the fixing element is not inserted into the hole of the connecting element and the hole of the first component part, and wherein the inserted first portion of the fixing element exerts a force against the inner lateral surface of the hole of the first component part, thereby pre-assembling the connecting element to the first component part by the fixing element.

2. The process of claim 1, wherein the diameter of the circumscribed circle of the first portion of the fixing element (11) is from 10 to 30% larger than the diameter of the hole of the first component part, and wherein the diameter of the circumscribed circle of the second portion of the fixing element is from 10 to 30% larger than the diameter of the hole of the connecting element.

3. The process of claim 1, wherein the first portion of the fixing element that has a circumscribed circle with a diameter being larger than the diameter of the hole of the first component part is elastically compressible to a diameter corresponding to or being smaller than the diameter of the hole of the first component part and the hole of the connecting element.

4. The process of claim 1, further comprising compressing the first portion of the fixing element having a circumscribed circle with a diameter being larger than the diameter of the hole of the first component part, wherein the first portion of the fixing element is elastically compressed to a diameter corresponding to or being smaller than the diameter of the hole of the first component part, and wherein the first portion of the fixing element is compressed before inserting the first portion of the fixing element into the hole of the connecting element and the hole of the first component part.

5. The process of claim 1, wherein the second portion of the fixing element that is not inserted into the connecting element and the first component part is from 10 to 70% by volume of the fixing element, based on the total volume of the fixing element.

6. The process of claim 1, wherein the fixing element comprises a material that has elastically compressible properties.

7. The process of claim 1, wherein the fixing element is a flexible device having a central pin and at least two legs attached to and arranged around the central pin, wherein each of the at least two legs has an extension at its uppermost position, and wherein the extensions are oriented in radial direction, and wherein the second portion of the fixing element comprises the extensions (16) of the at least two legs, and wherein the first portion of the fixing element comprises the at least two legs without the extensions, and wherein the first portion of the flexible device can be elastically compressed by bending the at least two legs elastically inwards towards the central pin.

8. The process of claim 7, wherein the flexible device is made from a metallic or a polymeric material.

9. The process of claim 7, further comprising elastically compressing the first portion of the flexible device by bending the at least two legs of the flexible device elastically inwards towards the central pin before inserting the flexible device into the hole of the connecting element and the hole of the first component part, and inserting the first portion of the flexible device into the hole of the connecting element and the hole of the first component part and pressing moving the flexible device onto the connecting element and the first component part, preferably against the stop of the flexible device (11) which is given by the extensions at the uppermost positions of the at least two legs of the flexible device.

10. The process of claim 7, wherein the central pin of the flexible device is protruding from the plane which is defined by the upper ends in axial direction of the extensions of the at least two legs of the flexible device.

11. A process for frictionally-coupling a first component part and a second component part with a connecting element, the process comprising pre-assembling the connecting element to the first component part by the process of claim 1, providing a second component part having a component joining surface and a hole, providing a bolt with dimensions such that it can be inserted into the hole of the first component part and the hole of the second component part and into the hole of the connecting element, aligning the hole of the second component part with the hole of the connecting element and the hole of the first component part, inserting the bolt into the hole of the second component part, inserting the bolt into the hole of the connecting element and the hole of the first component part and removing the fixing element from the hole of the connecting element and moving the fixing element completely into the hole or out of the hole of the first component part, bringing the second joining surface of the connecting element into close contact with the joining surface of the second component part, pressing the hard particles of the first joining surface of the connecting element into the component joining surface of the first component part, pressing the hard particles of the second joining surface of the connecting element into the component joining surface of the second component part, and mechanically fixing the bolt, thereby frictionally-coupling the first component part and the second component part with the connecting element.

12. The process according to claim 11, further comprising inserting the second portion of the fixing element into the hole of the second component part, after pre-assembling the connecting element to the first component part and before the bolt is inserted into the hole of the second component part.

* * * * *

UNITED STATES PATENT AND TRADEMARK OFFICE
CERTIFICATE OF CORRECTION

PATENT NO. : 11,118,614 B2
APPLICATION NO. : 17/125588
DATED : September 14, 2021
INVENTOR(S) : Georg Victor Page 1 of 1

It is certified that error appears in the above-identified patent and that said Letters Patent is hereby corrected as shown below:

In the Claims

Column 18
Line 45, In Claim 1, delete "a connecting" and insert -- the connecting --, therefor.
Line 45, In Claim 1, delete "a first" and insert -- the first --, therefor.

Column 19
Line 22, In Claim 2, delete "fixing element (11)" and insert -- fixing element --, therefor.
Line 61, In Claim 7, delete "extensions (16)" and insert -- extensions --, therefor.

Column 20
Line 16, In Claim 9, delete "flexible device (11)" and insert -- flexible device --, therefor.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*